ELECTRONIC DEVICES AND PROCESS FOR FORMING SAME

Filed March 28, 1961 2 Sheets-Sheet 1

Howard O. McMahon
John L. Miles
INVENTORS

BY [signature]
Attorney

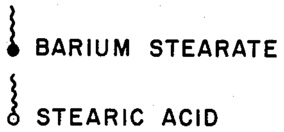
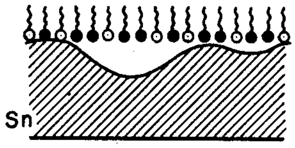
FILM AS TRANSFERRED
Fig. 8
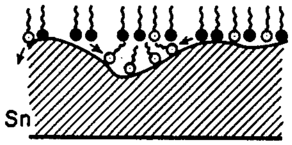
DIFFUSION OVER Sn SURFACE TAKING PLACE
Fig. 9
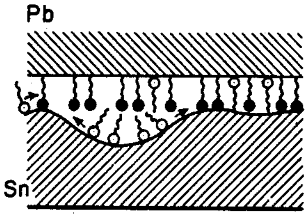
AFTER DEPOSITION OF Pb SURFACE
Fig. 10
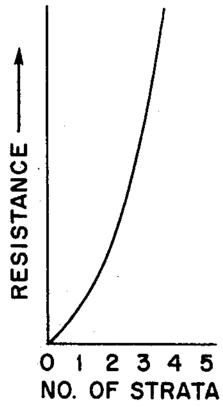
Fig. 11
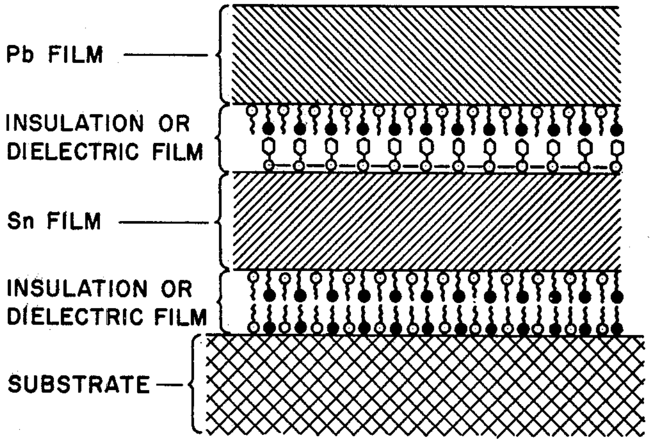
Fig. 12
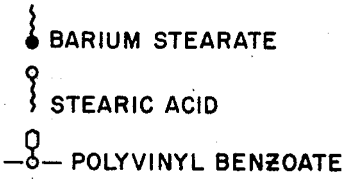
Howard O. McMahon
John L. Miles
INVENTORS.
BY [signature]
Attorney United States Patent Office 3,149,299

Patented Sept. 15, 1964

3,149,299

ELECTRONIC DEVICES AND PROCESS FOR FORMING SAME

Howard O. McMahon, Lexington, and John L. Miles, Belmont, Mass., assignors to Arthur D. Little, Inc., Cambridge, Mass., a corporation of Massachusetts Filed Mar. 28, 1961, Ser. No. 98,921

22 Claims. (Cl. 338—32)

This invention relates to electronic elements and to a method for controlling the passage of current from one associated conducting body to another.

The trend in electronic elements is now toward a high degree of miniaturization. For example, the well known cryotrons which require an insulating member between two superconductors and the electronic devices which require the establishment of a tunneling current between two bodies are both formed in extremely small sizes.

In both the case of the cryotron and the tunneling device it is necessary to have a means and method for controlling the passage of current from one conducting body to another. In the case of the cryotron the means should be an insulator, while in the case of the tunneling device it should be a dielectric layer capable of allowing the passage of a substantial tunneling current. Thus, it is desirable to have method and means for controlling the passage of a current so that it may be made to vary from substantially zero to a substantial tunneling current.

In the prior art of constructing cryotrons, and in the now developing art of constructing tunneling devices, it has been customary to control the passage of the current from one conducting body to another by one of three methods. The first of these is the interposition of a thin film of a plastic material such as Mylar between the conducting bodies. The second method has been that of depositing, by vacuum deposition techniques, a thin film of an insulating material such as SiO on one of the conducting bodies. Finally, the third method has involved permitting the surface layer of an otherwise conducting body to become oxidized to form a layer of an oxide which is a dielectric material. For example, if aluminum is deposited upon a substrate and the surface is permitted to oxidize to $Al_2O_3$, there is formed a film of the dielectric oxide. This method is, however, limited to only a very few metals and hence restricts the components which can be used in the device to be constructed.

The above-described methods for controlling the passage of current in miniature electronic elements has several disadvantages. Among these disadvantages may be listed, first, difficulty in obtaining extremely thin continuous films, particularly those thin enough to permit the passage of a tunneling current. The second disadvantage resides in the difficulties encountered in monitoring film thicknesses, especially those formed by vacuum deposition. This in turn means that it is difficult to control thicknesses and to accurately reproduce them from element to element.

It would be desirable to be able to provide an extremely thin layer of a material which can be used to control the passage of a current from one conducting body to another. It would also be desirable to use the same material and technique for various devices including those which require efficient insulation as well as those which require the passage of a tunneling current.

It is therefore an object of this invention to provide a method of controlling the passage of current from one conducting body to another when an electrical potential difference is maintained between the bodies. It is another object to provide an improved method of making miniature electronic elements in which it is necessary either to insulate bodies or to join them in such a fashion as to permit a tunneling current to pass from one to another.

It is still another object of this invention to provide new and improved methods for constructing cryotrons and tunneling devices, methods which include the incorporation of nonconducting layers having constant and reproducible thicknesses.

It is another primary object of this invention to provide an electronic element which has a very thin layer of a material which can be used as an insulator, or as a dielectric which allows the passage of a substantial tunneling current. It is another object to provide an electronic element of the character described which has insulating or dielectric layers of accurately reproducible thicknesses which are much less than those which could previously be obtained. It is still another object of this invention to provide electronic elements of the type described which permit flexibility in their design and behavior. These and other objects will become apparent in the following discussion of this invention.

In accordance with this invention the process for controlling the passage of current from one conducting body to another conducting body when an electrical potential difference is maintained between the bodies may be characterized by the step of interposing between the bodies and joining a surface of each of the bodies with a thin film formed of one or more monomolecular strata of a material having a hydrophobic portion and a hydrophilic portion and being capable of bonding to the surface of the bodies thereby to form a rigid film of reproducible and predetermined thickness.

The new electronic element of this invention may be generally described as a circuit element comprising two associated conducting bodies joined by a thin film formed of one or more monomolecular strata of a material having a hydrophobic portion and a hydrophilic portion and being capable of bonding to the surface of the bodies thereby to form a rigid film of reproducible and predetermined thickness.

FIGS. 8–10 are diagrammatic representations of the postulated behavior the film strata corresponding to the steps of the process shown in FIGS. 6 and 7;

FIG. 11 represents the resistance across a layer of the film-forming material as it varies with the number of layers deposited;

FIG. 12 is a diagram in cross-sectional view of an electron element constructed to compensate for different coefficients of thermal expansion of the components of the element.

Before discussing the deposition of the layer which is to control the passage of current from one conducting body to another, it will be helpful to look briefly at two types of electronic elements which are among those to which the process and product of this invention are applicable, and to further discuss briefly the performance attained by each.

Figures 1, 2:
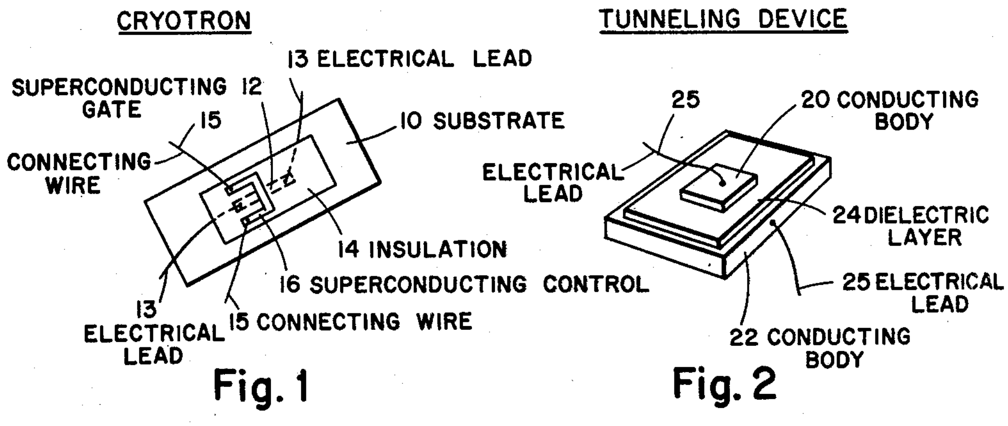
FIG. 1 represents a typical cryotron construction.
FIG. 2 represents a typical tunneling device.

First, in FIG. 1, there is illustrated a typical cryotron configuration. It consists of a substrate 10 on which is first deposited a first superconducting material 12 such as tin. The deposition of the thin strip 12 is preferably accomplished by vacuum deposition techniques. Above the superconducting strip 12 is then placed an insulating layer 14 in accordance with this invention. Finally on the insulating layer 14 is deposited a second superconductor 16, such as lead, in a position so that at least a portion of it is directly above the superconducting film 12.

The cryotron of FIG. 1 represents the simplest form of cryotron and its performance may be described very briefly. In this particular configuration strip 12 is a cryotron gate while strip 16 is a cryotron control, and they are electrically insulated. It will be appreciated that when these materials are in their superconducting state and a current is passed through gate 12 by means of the wires 13 no resistance will be offered to the passage of current through gate 12. When control 16 is effectively insulated by layer 14 from gate 12 and sufficient current is then passed through control 16 by means of connecting wires 15, a point will be reached at which the magnetic field induced about gate 12 will be sufficient to quench the superconductivity in gate 12, and it will therefore become resistive. It will be appreciated that this is in itself a type of switch and that many of such elements may be incorporated into a device by means now known to form flip-flops, persistent current memories and the like. It is necessary in a cryotron configuration to provide effective insulation between the gate 12 and the control 16 and this is done by the film 14 in accordance with the process of this invention.

Turning now to FIG. 2, there is shown a very simplified form of a tunneling device. In this figure two conducting bodies 20 and 22 are spaced apart and joined by a dielectric layer 24 which permits the passage of a substantial tunneling current when an electrical potential difference is established between the conducting bodies 20 and 22. It has been found for example in the case where both of the conducting bodies 20 and 22 are in a state in which they exhibit characteristic electron energy gaps, when a voltage is applied across the configuration of FIG. 2 through the leads 25, the device is capable of exhibiting an area of dynamic negative resistance such as illustrated in FIG. 3.

Figure 3:
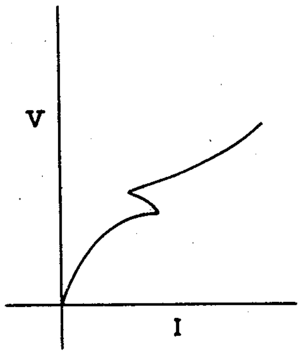
FIG. 3 is a performance curve for a tunneling device such as shown in FIG. 2.

It will be seen from an examination of FIGS. 1–3 that it is necessary in devices such as cryotrons and tunneling devices to be able to accurately and efficiently control the passage of an electrical current by either preventing the passage of any substantial current as in the case of the cryotron, or by permitting the passage of some current by tunneling as in the case of the device of FIG. 2. The process of this invention permits accurate and reproducible insulating or dielectric layers to be incorporated into electronic elements by simple and economical means.

There is in the literature a great deal concerning the formation and laying of stratified layers of materials which can best be defined as those which contain a relatively long hydrophobic portion having attached thereto a hydrophilic end group. Such a material is diagrammatically represented in FIG. 4*a*. The films formed have been used extensively for optical investigations and have normally been used in layers having a large number of strata, e.g., from 20 to several thousand. Although the films thus built up of strata having a large number of monolayers have been known to have interesting optical properties, it is totally unexpected that one or a few strata of such films would have electrical properties which permit the control of the passage of an electrical current through them.

The literature describes several methods by which film strata of these film-forming materials may be built up to form layers, one monomolecular stratum on another. The first of these methods is one which was developed by Blodgett and Langmuir and is described in detail in U.S. Patent 2,220,860 as well as in the Journal of the American Chemical Society 57, 1007–1022 (1935) and in Physical Reviews 51, 964–982 (1937). This first technique involves the spreading on pure water (or on a dilute aqueous solution) a solution of the material which is to form the film, the solvent used being one which is immiscible with water. The film-forming material as it contacts the water surface spreads out with the hydrophilic portion being attracted to the water surface while the hydrophobic portion assumes a near vertical position. Thus for example a hydrocarbon having a hydrophobic chain and a hydrophilic head will form a monomolecular layer in which the hydrocarbon chain is nearly vertical. After the solvent evaporates the film-forming molecules can be compressed into a closely packed monomolecular layer and in this form picked up on a substrate which is dipped into the water and then withdrawn. In order to form a closely packed film which is fairly rigid (i.e., the hydrophobic portions are substantially immobilized) it is convenient to apply pressure to the periphery of the film-forming material lying on the casting liquid surface. Such pressure is conveniently applied by the use of an "oil piston" separated from the film by a suitable boundary such as a waxed thread.

It is often convenient in forming a film by this method to incorporate into the water or casting surface liquid a soluble salt of a metal which is capable of reacting with the hydrophilic head portion of the film-forming molecule. Thus for example stearic acid dissolved in benzene may be cast on a dilute solution of barium carbonate to form a barium stearate film. It will be appreciated that in such a case the pH of the aqueous solution will determine the relative proportion of stearic acid and of barium stearate in the final film strata. For example, in the case of stearic acid cast on a dilute barium carbonate aqueous solution the amount of barium stearate formed increased from 15 to 96% of the total film when the pH was raised from 4.5 to 10.5. The importance of the presence of the two film-forming components will be discussed below.

Once the films are formed on the casting surface liquid they are transferred to a solid surface, such as a thin film of a metal, by passing the solid substrate through the surface of the casting liquid. When the substrate surface passes from the solution back into air the hydrophilic heads of the film-forming molecules attach themselves to the substrate as illustrated in FIG. 4*a* while the hydrophobic tails are left projecting. The substrate emerges completely dry. Films attached in this orientation are known as B films. When the direction of travel of the substrate is reversed, the film folds over and leaves the hydrophilic heads on the surface; films with this orientation being known as A films. When films are attached alternately by raising and lowering the slide, the resulting multilayer is composed of alternate BABABA layers. Films in such an arrangement are known as Y films. In some circumstances, films only attach themselves on the downward travel and are thus of the form AAAA. These are known as X films. The case of multilayers of the type BBBB are rare and have been called Z films.

A second method of depositing the necessary strata is a variation of the first method and comprises heating the casting surface liquid to a temperature which allows the film-forming material, which is on the casting liquid surface, to spread. The film thus formed is free from any possible contamination by a solvent.

A third method comprises depositing the film directly from a solution of the material without the use of a casting surface liquid by immersing the substrate into the solution and then slowly withdrawing it. However, this is not considered a satisfactory method for depositing a film layer when that layer is to consist of only one monomolecular stratum. It is, on the other hand, a satisfactory method of laying down a first stratum on which additional strata are to be deposited by techniques described above.

In forming the original stratum of the film on a substrate surface it appears that in the process of laying the stratum the hydrophilic end groups of the molecules are anchored to the substrate while the hydrophobic portion is held in essentially a vertical position. In the case of hydrocarbons where the hydrophobic portion is a long chain, the thickness of each stratum is determined by the length of the chain. Likewise in other film-forming materials the extent to which the hydrophobic portion extends beyond the substrate surface is a measure of the stratum thickness. In the case of hydrocarbon chains it has been found for example that the same number of molecules of a large number of different compounds having widely different hydrophilic end groups and chain lengths occupy essentially the same area of surface on the substrate, a logical conclusion from these data is that the hydrophobic chains occupy an essentially vertical portion. This is also strengthened by the fact that the thicknesses of an individual stratum of the film is a function of the chain length. As typical thicknesses the following may be cited:

| Film: | Film thickness of monomolecular layer in A. |
| --- | --- |
| Oleic acid | 11.2 |
| Polyvinyl benzoate | 20.0 |
| Stearic acid | 24.2 |
| Barium stearate | 24.4 |
| Arachitic acid | 26.9 |
| Cerotic acid | 31 |
| Cetyl palmitate | 41 |

In attempting to explain the reason for the film behavior it is of interest first to discuss what type of forces hold the head of the molecule to the substrate and in particular whether a chemical bond exists. The weight of scientific evidence tends to indicate that there is in fact a chemical bond between the molecule (more particularly its hydrophilic head) and the substrate on which it is placed and that the largest part of the energy of absorption between the film and the substrate is due to the attractive forces of the head of the molecule.

Figure 4:
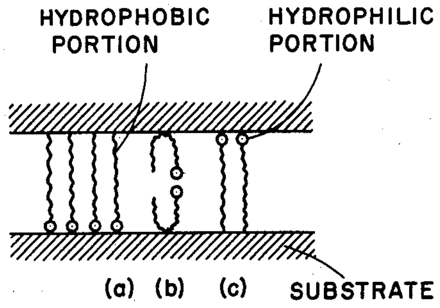
FIG. 4 is a diagrammatic sketch of the film-forming material and how it may be oriented.

In studying these films it has been found that there can be a definite diffusion of the molecule from surface to surface under some circumstances. This diffusion is related to the quality of the molecule as well as to the physical and chemical characteristics of the surface. For example, when stearic acid films were placed on a mica substrate and a second mica substrate placed on top of the film it was found that about one-half of the molecule making up the mono layer would transfer to the second mica substrate. If, however, the second substrate were a film of tin almost all of the molecules would diffuse and transfer to the tin surface. When barium stearate films were used, the transfer was small, which indicates that only stearic acid was diffusing. This is of importance in understanding the character of the film which is formed in the process of this invention. At first consideration it would appear difficult to understand how such diffusion could take place in a closely packed stratum, but FIG. 4 illustrates how this may be possible as proposed by Langmuir. Thus two molecules could so move in a roundabout way that the hydrophilic head could switch from one surface to another. The actual importance of this type of diffusing would be discussed below in detail in connection with FIGS. 8–10 which are presented in discussing the electrical performance of these strata and their role in electronic devices.

Before further defining the film-forming material and several of the variables in handling it, the basic steps of constructing an electronic element in accordance with the process of this invention may be described. These steps are illustrated in FIGS. 5, 6 and 7 which represent three steps in the formation of an electronic element using one or several strata of films as a dielectric layer or an insulator.

Figure 5:
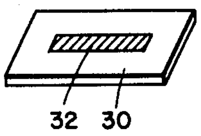
FIGS. 5–7 represent steps in the construction of a typical element of this invention.

In FIG. 5 there is shown a substrate 30 on which a thin film of a conducting body (e.g., a normal conductor, a superconductor or a semiconductor) is deposited, conveniently from the vapor phase.

Figure 6:
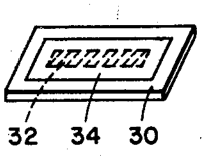

In FIG. 6 is illustrated the step in which a layer of the film-forming material in accordance with this invention is then deposited over the conducting material 32 which has been placed on substrate 30. This layer 34 may be a single stratum of the film-forming material or may be several strata deposited successively to form the layer. Finally, in FIG. 7 there is added to the layer 34 another layer of conducting material 36 which may be, as in the case of layer 32, a normal conductor, a superconductor or a semiconductor. This is preferably deposited from the vapor phase.

Figure 7:
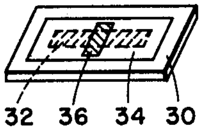

It will, of course, be appreciated in connection with FIGS. 5–7 as well as in connection with FIGS. 1 and 2 that the dimensions are not in scale and that the drawings are schematic to show the relationship of various materials. They are, therefore, not used to illustrate a finished cryotron or tunneling device configuration. It will further be appreciated by anyone skilled in the art how the process described with reference to FIG. 5 may be varied to construct many different types and configurations of electronic elements. As an example, the substrate 30 may be identical with the first film 32 thus making it one of the conducting bodies. In general, however, at least one of the conducting bodies making up the element will be deposited from the vapor phase to form the necessary conducting body in the form of a film such as illustrated in FIGS. 5–7.

It is now possible to apply the above brief review of the knowledge of stratum formation and behavior to a possible explanation of the steps in the process which are described in conjunction with FIGS. 5–7. The explanation of what happens physically begins with the deposition of the monomolecular stratum 34 (FIG. 6) upon the first metal film layer 32. In the following description it is assumed that it is desired to make a circuit element of a thin layer of tin and lead separated by a dielectric film formed of barium stearate containing a small amount of stearic acid. It will be appreciated, however, that the invention is not limited to these metals or this film-forming material, but that the following explanation is most conveniently given in terms of this example.

The cross-sectional representation of FIGS. 8–10 are, of course, exaggerated with respect to size and no attempt is made to draw the film or the metal surface to scale.

It is known from investigations of metal film layers put down through vacuum deposition techniques that the metal surface when examined under an electron microscope is comparatively rough containing numerous hills and valleys. These are illustrated in FIGS. 8–10 in the form of a typical tin film surface. Previous experimental work has shown that at least the first film stratum put down by one of the techniques described above does not in fact precisely follow the contour of the substrate but rather forms an extremely smooth surface, as illustrated in FIG. 8. This means that substantially all of the stearic acid and barium stearate molecules are aligned on a single level plane as shown in FIG. 8. That is, the monomolecular stratum is absorbed on the high points of the tin but is stretched over the valleys.

Subsequent to the deposition of the stratum the stearic acid molecules will begin to diffuse in accordance with observed performance indicated above. They will move from the free stratum onto the surface of the tin as illustrated in FIG. 9. This is due to the fact that the position in which the COOH head of the molecule is in contact with the tin is more favorable energetically. An equilibrium position will be reached if sufficient time is allowed to elapse before the next step which is the deposition of the second metal layer, as indicated in FIG. 7. In this step a film of lead is deposited on top of the single stratum of stearic acid/barium stearate film. Now the relatively free stearic acid molecules in the unsupported stratum will overturn so that their COOH groups diffuse and contact the lead surface as shown in FIG. 10. The free stearic acid molecules on the surface of the tin valleys will tend to move back to the stratum since their previous position in this mono-molecular layer has become energetically more desirable. It is quite possible that the positions of lowest energy are now on top of the tin hills. Some indication for this is the fact that an increase in resistance between the metal films has been noted on occasions with the passage of time.

FIG. 11 illustrates the relationship between resistivity of an element such as shown in FIG. 2 with the number of strata making up the film layer indicated at numeral 24 in FIG. 2. Thus when an assembly is made such as illustrated in FIG. 2, wherein the conducting bodies 20 and 22 are materials such as lead and indium and the film material is barium stearate, the resistance across the assembly rises exponentially with the number of strata making up the layers. It will be seen from this example that when one stratum is used (i.e., a monomolecular layer of the film-forming material) in an arrangement such as shown in FIG. 2 using two superconducting materials as conducting bodies 20 and 22, it is possible to pass a substantial tunneling current through the assembly to obtain a performance such as illustrated diagrammatically in FIG. 3. Where, however, in this example more than three strata are built up to form the layer, the tunneling current is materially reduced and the film tends to become insulating.

It should be noted that in some instances the same number of strata making up the layer will be an insulator; while in other cases it will permit the passage of a tunneling current depending upon the electrical potential difference across the two conducting bodies, upon the bodies themselves and upon the film-forming material. Thus, there is provided not only a means of electrically insulating two bodies from each other or of permitting a tunneling current to pass from one to the other, but also of achieving a degree of control which has heretofore not been possible.

In the employment of electron devices such as cryotrons and tunneling devices which incorporate superconducting bodies in their construction it is, of course, necessary to maintain the electron element at cryogenic temperatures, that is, temperatures below which the metals are superconducting. Since it is customary to form these electronic elements on substrates such as glass it will be appreciated that there is presented a problem of making elements composed of materials having very different coefficients of thermal expansion The ability to withstand the required cooling usually to liquid helium temperatures and the accompanying differentials in contraction are very important The problem of the differences in coefficients of thermal expansion may be eliminated by the use of a construction such as illustrated in FIG. 12. Basically this construction allows for the easy slippage between layers, particularly between a massive substrate and the first metal layer.

Turning to FIG. 12 it will be seen how this necessary slippage may be provided by forming two-strata films which provide slippage. In this example a film between the substrate and the first metal film is formed of two monomolecular layers of barium stearate-stearic acid laid down in the same orientation. In accordance with the theory presented in connection with FIGS. 8–10 the deposition of a metal film such as tin on the upper layer causes the stearic acid molecules to turn over and occupy the position shown in FIG. 12. Thus, there results between the two monomolecular strata an intermediate surface of low energy which provides easy slippage during cooling. On the tin film a layer of a film-forming material such as polyvinyl benzoate is then deposited and a layer of metal stearate-stearic acid put on top of it. With the subsequent deposition of a lead film, for example, on this second film the stearic acid molecules again turn around and again there results an intermediate surface of low energy permitting slippage between the tin and lead films.

It will be appreciated from an examination of the model presented in FIG. 12 that the substrate such as glass, the tin and the lead may all exhibit different coefficients of thermal expansion without materially altering the spacing between these components, for lateral expansion is permissible without disturbing the spacing between them or without disturbing the two strata making up the films which separate them.

The film-forming materials which are capable of forming the necessary strata to build up the film for the practice of this invention are those materials which possess in their molecular structure both a hydrophobic and a hydrophilic portion, the hydrophilic portion of which is capable of exhibiting an attraction for and bonding to a smooth (metal or glass) surface, whether the attraction is chemical or physical. The film-forming material should also be capable of forming a substantially rigid monomolecular stratum capable of supporting additional strata of the same or different film-forming materials or a thin metal film. It should be essentially water insoluble or be capable of being converted to a water-insoluble state. Although it need not be a solid at room temperatures it should be capable of forming a reaction product (e.g., soap or metal compound) which is solid at temperatures at which the electronic element is to be constructed.

A number of film-forming materials may be used in the practice of this invention. These include, but are not limited to, the long-chain hydrocarbons and fluorocarbons; polymeric materials, such as polyvinyl benzoate, which are capable of deposition in a tightly packed monomolecular layer; and proteinaceous film-forming materials. Of the latter type, insulin having the formula $C_{45}H_{69}O_{14}N_{11}S.3H_2O$ may be cited as an example.

The hydrocarbons and fluorocarbons may be further defined as compounds having the formula $C_nX_{2n+1}R$, where X is selected from the group consisting of hydrogen and fluorine and R is a group having hydrophilic characteristics. The grouping R may be chosen from a large number of polar groups which are hydrophilic in nature and which are capable of serving as the required anchoring head for the $C_nX_{2n+1}$ chain. Among the suitable R groups may be listed —COOH, $—COOC_2H_5$ (each end), $—CH_2NH_2$, $—CONH_2$, $—COCH_3$, $—COOCH_2$, $—NH·CO·NH_2$, $—NH·CO·CH_3$, —COOR, $—CH_2OH$, —CH:CHCOOH, $—CH:CH.COOC_2H$, $—C_6H_5OH$, $—C_6H_5OCH_3$, $—C_6H_5NH_2$, $—NHCONH_2$, —C≡N, —CHBrCOOH, $—NHCOCH_3$, $—COOCH_2CHOHCH_2OH$, $—COC_6H_2(OH)_2$, $—COC_6H_2(OH)_3$, $—C_6H_5NHCOCH_3$, —CH=NOH, $—C_6H_4(OH)_2$, $—OCOCH_3$,

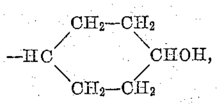

and

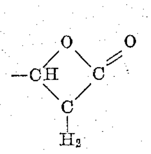

The length of the hydrophobic chain chosen is related to the nature of the hydrophilic end group and may be varied from about 7 to any desired maximum (see for example Table III, pages 50 and 51 in "The Physics and Chemistry of Surfaces" by N. K. Adam, third edition). It will be seen from the literature references noted that wide variations are permissible in not only the chain length but in the hydrophilic end group. Although normally the chain will be a hydrocarbon it is also possible to use the corresponding fluoro carbon chain and in some cases this is to be desired because the fluoro compounds have higher melting points than their hydrocarbon counterparts. Where long term stability is required then it is more desirable to use higher melting point film-forming materials.

If the film-forming material is to be formed into a solution before laying it on the casting surface liquid it must of course be dissolved in a suitable solvent which is preferably essentially immiscible with the water (or other casting surface liquid) from which the film is to be picked up. In the case of a hydrocarbon or fluorocarbon film material, the water (or other casting surface liquid) preferably contains dissolved in it a metal ion which will in turn react with the film-forming material to form the corresponding metal compound. Thus for example, if the film-forming material is stearic acid, the water preferably contains a soluble metal salt such as barium acetate or barium carbonate which converts a portion of the stearic acid to barium stearate to produce the mixed strata-forming material. It is believed that at least in some cases the metal compounds form better bonds as the hydrophilic head portion contacts the substrate surface.

Likewise, in the case of the protein film formers it is preferable to use a metal salt of the protein. For example, the copper salt of insulin is a solid film-forming material which meets the requirements for this material in this invention.

The solvents for the film-forming material may be any organic liquid in which the film-forming material may be dissolved. A wide range of concentrations is acceptable and the actual concentration of any one solution of film-forming material will depend upon the material/solvent system used. For convenience in handling, the solvents are preferably substantially immiscible with the liquid which is used as the liquid surface for casting the film. Since this latter liquid will generally be water, the solvent for the film-forming material will normally be substantially water-immiscible. Among the solvents which may be used may be listed benzene, toluene, kerosene, petroleum fractions, Shellysolve C, carbon tetrachloride, ethylene trichloride and the like. These solvents are equally well suited to the film casting method which comprises applying a solution of the film-forming material directly to a substrate as described above.

The metal ions which may be present in solution in the casting surface liquid and which are available for reaction with the film-forming material, if such a reaction can take place, may be any which can be put into a soluble form in the surface casting liquid and which will react with the film-forming material through attachment to the hydrophilic portion or head to form a metallic compound, e.g., a soap or salt. These metal ions may include, but are not limited to, barium, calcium, magnesium, strontium, copper, nickel, aluminum, iron and the like.

The pH of the casting surface liquid may influence the quality of the stratum or strata making up the film. For example when the film is a soap formed by the reaction of a fatty acid, dissolved in a water-immiscible solvent cast on water containing metallic ions, the pH of the casting surface liquid will determine the makeup of the film stratum picked up. That is, it will determine the relative proportions, of fatty acid and soap which constitute the final film. This may be further illustrated with reference to the formation of calcium and barium stearate films when a stearic acid solution was cast on $10^{-4}$ molar solutions of $CaCO_3$ and $BaCO_3$, respectively. The pH of the dilute aqueous salt solutions used as the casting surface liquid was maintained in a series of experiments at 4.5, 6.9, 8.5 and 10.5. The corresponding percent conversion to the neutral soap calcium stearate was 24, 84, essentially 100 and 100%, respectively; while the percent conversion to the neutral soap barium stearate was 15, 56, 89 and 96%, respectively. Thus pH control offers a means of controlling film composition and hence film behavior as outlined in connection with the descriptions of FIGS. 8–10 above.

In constructing circuit elements in accordance with this invention it is first necessary to provide a surface of the conducting body (conductor, semiconductor or superconductor) which is to form one of the associated conducting bodies. This surface may be coextensive with a part of the electronic apparatus in which the element is incorporated or it may be a separate conducting surface, e.g., a film formed by vacuum deposition on a substrate.

Preparation of the conducting body surface for receiving the film should include, if necessary, a thorough cleaning of the surface to remove all traces of foreign matter, oil, grease and the like. If the film surface has been formed by vacuum deposition it is only necessary to keep it clean.

In casting the thin film the technique developed by Blodgett (U.S.P. 2,220,860) is preferably used. Briefly it comprises filling a suitable trough or other container with the casting surface liquid (usually water) and introducing onto the surface the solution of the film-forming material. It is necessary to obtain a uniform deposition of the film on the conducting body surface and this requires maintaining the film-forming material subsequent to solvent removal in the proper physical state as a monolayer. This in turn requires maintaining a lateral pressure on the boundaries of the film to maintain its integral nature. A convenient way of doing this is to enclose the film on the water within the boundaries of a waxed thread floating on the surface and using an "oil piston" to apply the required pressure against the thread. This technique is also applicable to films formed on a casting surface liquid by heating without the use of a solvent.

Once the film is properly established on the casting surface liquid the conducting body or other substrate, the surface of which is to be coated, is dipped in and withdrawn by any suitable means which will provide an even rate of dipping and withdrawal without any backlash movement. Deposition of a film stratum is easily determined by observation of the movement of the string and oil piston which indicates a lessening of film area on the liquid surface comparable to the film area deposited. Film stratum or film strata may be thus deposited upon the substrate surface directly (such as illustrated in FIGS. 5–10) or the substrate may be first given a monomolecular film by treating it directly with a solution of a film-forming material. A stratum laid down in this manner is suitable as a base stratum but not as a single stratum or as a second or subsequent stratum used to build up a film of two or more strata. It follows that deposition of a monomolecular layer directly from solution without casting on a liquid surface is not suitable for constructing an electron element where the associated conducting bodies are to be separated by one stratum of film.

The number of strata built up in this manner to form the film will depend upon the electrical properties required of the film. As explained above, the film thickness is a function of the length or height of the hydrophobic portion of the film-forming material molecule which extends above the surface to which the film stratum is affixed. For example, in the case of a hydrocarbon or fluorocarbon chain it is dependent upon chain length, while in the case of a polymeric material, such as polyvinyl benzoate, it is the height of the hydrophobic portion which extends above the surface in apparently a near vertical position.

Whether the film built up is a true insulator or a dielectric layer which permits the passage of a substantial tunneling current in turn is a function of the film thickness. It will be appreciated that there is offered a wide choice of film-forming materials, of film thickness and of performance characteristics, each of which may be varied to obtain precisely the properties desired. Very accurate control of film thickness and hence performance of the film in an electrical circuit is possible and the monitoring of film thickness becomes merely a matter of choosing the correct film-forming material or combination of materials.

In forming an electronic circuit element which must be capable of permitting the passage of a tunneling current (that is, the interposed film serves as a dielectric layer) it will generally be desirable to use from one to three strata to form the film. When the film is to serve as an insulator, such as in a cryotron, then it will be preferable to use sufficient strata to build up a film thickness of about 100 A. However, the total number of strata in this case should not exceed about 15 or about 400 A.

Where one to three strata are used it will be possible to build up film thicknesses of the order of about 10 to 100

A. For example, a monolayer of barium stearate film (i.e., a single stratum) is 24.40 A. thick.

After the insulating or dielectric film comprised of one or more strata of the film-forming material has been cast on the metal surface, a second conducting body is deposited preferably from the vapor phase. This in conveniently accomplished by well-known vacuum deposition techniques.

The process and product of this invention may be further described with the following specific examples which are meant to be illustrative and not limiting. These examples illustrate the construction of typical tunneling devices and a typical cryotron.

To construct a tunneling device three strips of tin each about 2000 A. thick were deposited on a clean glass microscope slide by standard vacuum deposition techniques. Onto the tin strips and slide was then deposited a single monomolecular stratum of a film of barium stearate with some stearic acid. This was accomplished by the technique described in U.S.P. 2,220,860 using an aqueous solution containing $3\times10^{-5}$ molar $BaCl_2$ and $4\times10^{-4}$ molar $KHCO_3$ as the casting surface liquid and a 0.13% benzene solution of stearic acid. The pH of the aqueous liquid was 7.2 and the film was laid down as the glass slide containing the tin strips was withdrawn from the aqueous liquid. Castor oil was used as a piston oil to insure maintaining a suitable film on the water. The film thus deposited was approximately 64% of the neutral barium stearate soap, the remaining being stearic acid. It was 24.40 A. thick.

A strip of lead about 2000 A. thick was then vacuum deposited at right angles to the thin strips covered with the film and the entire specimen was then covered with several monolayers of stearate-stearic acid film to protect the electronic elements thus formed on the glass slide. The voltage-current characteristics observed at 2.90° K. were essentially identical to those illustrated in FIG. 3. It should be noted that these samples gave excellent results in the direct measurement of the superconducting energy gaps of tin and lead. Moreover, the elements thus constructed are capable of withstanding the strain of a temperature change from 300° K. to 2.9° K. without breaking.

In like manner tunneling devices were constructed of tin and indium and indium and lead.

A cryotron was made in a manner similar to the tin-lead tunneling device described above, except that seven strata of the barium stearate-stearic acid were used to form the film between the superconducting tin and lead. The film of this thickness was insulating thus causing the element, when cooled to a suitable temperature, to act as a cryotron as described in the discussion of FIG. 1.

It will be appreciated that the process of interposing films of one or more monomolecular strata between conducting bodies may be used to build up a plurality of electrically conducting bodies and that the resulting elements may comprise a plurality of bodies separated by films of the same or varying thicknesses.

From the above description it will be seen that this invention provides a novel method for controlling the passage of current from one electrically conducting body to another. Inherent in this method is an accurate means for controlling and monitoring the thickness of a film in the process of constructing electronic elements formed of electrically conducting bodies. This invention also provides improved electronic elements, among which may be listed tunneling devices and cryotrons.

Many variations are possible within the scope of this invention without departing from the essential features of the invention.

We claim:

1. Process for forming a circuit element having two associated conducting bodies and adapted to control the passage of current from one of the electrically conducting bodies to the other electrically conducting body when an electrical potential difference is maintained between said bodies, characterized by the step of casting upon a liquid surface a film of dielectric material, passing one of said conducting bodies through said film on said liquid surface, thereby providing on a surface of said body a thin continuous rigid film comprising an individually deposited monomolecular stratum of a film-forming, essentially water-insoluble material which in its molecular structure, has a hydrophobic portion and a hydrophilic end group capable of anchoring said hydrophobic portion in a substantially vertical position with respect to the surface of one of said bodies, and which is capable of forming a substantially rigid monomolecular structure, and affixing to said film a surface of the other of said bodies.

2. Process for forming a circuit element having two associated conducting bodies and adapted to control the passage of current from one of the electrically conducting bodies to the other electrically conducting body when an electrical potential difference is maintained between said bodies, comprising the steps of depositing on the surface of a first conducting body at least one stratum of a dielectric material, thereby to form a continuous rigid film on said surface and affixing to said film a second conducting body, said dielectric material being a film-forming, essentially water-insoluble material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said dielectric material having been formed by casting on a liquid surface, and having been applied to said first conducting body by passing the latter through the surface of the casting liquid.

3. Process in accordance with claim 2 wherein said affixing of said second conducting body comprises forming a film of said second conducting body from vapor onto said continuous film of dielectric material.

4. Process in accordance with claim 2 wherein between one and three strata of said dielectric material are deposited thereby to form a continuous film which permits the passage of a substantial tunneling current between the two conducting bodies.

5. Process in accordance with claim 2 wherein more than three strata of said dielectric material are deposited thereby to form an insulator between said conducting bodies, the maximum thickness of said insulator being 400 A.

6. Process for forming a cryotron, characterized by interposing between two associated superconducting bodies a thin continuous rigid film comprising individually deposited monomolecular strata of a film-forming, essentially water-insoluble material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said dielectric material having been formed by casting on a liquid surface, and having been applied to one of said associated conducting bodies by passing the latter through the surface of the casting liquid, said film being of sufficient thickness to electrically insulate said superconducting bodies and having a maximum thickness of 400 A.

7. Process for forming a tunneling element, characterized by interposing between two associated electrically conducting bodies formed of materials capable of exhibiting electron energy gaps a thin continuous rigid film comprising individually deposited monomolecular strata of a film-forming, essentially water-insoluble material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said dielectric material having been formed by casting on a liquid surface, and having been applied to one of said associated conducting bodies by passing the latter through the surface of the casting liquid, said film comprising no more than three of said monomolecular strata and being capable of permitting the passage of a substantial tunneling current between said conducting bodies.

8. Process of forming an electron element, comprising the steps of depositing on the surface of a first electrically conducting body a thin continuous rigid film formed of individually deposited monomolecular strata of a film-forming, essentially water-insoluble dielectric material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said dielectric material having been formed by casting on a liquid surface, and having been applied to said first conducting body by passing the latter through the surface of the casting liquid, and subsequently depositing a film of a second electrically conducting body from the vapor phase into the surface of said thin film.

9. Process of forming an electron element, comprising the steps of depositing a first film of an electrically conducting body from the vapor phase onto a substrate, depositing on the surface of said first film a second film of a dielectric material, and subsequently depositing on the surface of said second film a third film of an electrically conducting body from the vapor phase, said second film being in the form of a continuous rigid film and being formed of individually deposited monomolecular strata of a film-forming, essentially water-insoluble material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said dielectric material having been formed by casting on a liquid surface, and having been applied to said first conducting body by passing the latter through the surface of the casting liquid.

10. Process of forming an electron element, comprising the steps of depositing on a substrate a first film, depositing on said first film a second film of an electrically conducting body from the vapor phase, laying on the surface of said second film a third film of a dielectric material, and subsequently depositing on the surface of said third film a fourth film of an electrically conducting body from the vapor phase, each of said first and third films being in the form of a continuous rigid film and being formed of individually deposited monomolecular strata of a film-forming, essentially water-insoluble material which in its molecular structure has a hydrophobic portion and a hydrophobilic end group capable of anchoring said hydrophobic portion in a substantially vertical position with respect to the surface of said substrate and of at least one of said electrically conducting bodies, and which is capable of forming a substantially rigid monomolecular structure, at least the final stratum of each of said first and third films having been formed by casting on a liquid surface, and having been applied to the surface of the corresponding electrically conducting body by passing the latter through the surface of the casting liquid.

11. Process in accordance with claim 10 wherein at least said first film is formed of at least two strata which permit lateral slippage between said strata.

12. Circuit element, comprising two associated electrically conducting bodies joined by a thin rigid film of a film-forming, essentially water-insoluble material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said film-forming material having been formed by casting on a liquid surface, and having been applied to one of said electrically conducting bodies by passing the latter through the surface of the casting liquid.

13. Circuit element in accordance with claim 12 wherein both of said associated bodies are superconductors.

14. Circuit element in accordance with claim 12 wherein at least one of said bodies exhibits an electron energy gap.

15. Circuit element, comprising two associated electrically conducting bodies joined by a thin rigid film comprising at least one individually deposited monomolecular stratum of a film-forming, essentially water-insoluble material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said film-forming material having been formed by casting on a liquid surface, and having been applied to one of said electrically conducting bodies by passing the latter through the surface of the casting liquid.

16. Circuit element in accordance with claim 15 wherein said thin film is formed of from one to three of said monomolecular strata thereby to permit the passage of a substantial tunneling current between said two electrically conducting bodies.

17. Circuit element in accordance with claim 15 wherein said thin film is formed of more than three of said monomolecular strata thereby to electrically insulate said electrically conducting bodies, said film having a maximum thickness of 400° A.

18. Circuit element in accordance with claim 15 wherein said film is a mixture of stearic acid and metal stearate.

19. Circuit element in accordance with claim 15 wherein said film comprises two strata having molecular arrangements which permit lateral slippage of said bodies.

20. Circuit element, comprising a substrate and two associated electrically conducting bodies joined by a thin continuous rigid film comprising individually deposited monomolecular strata of a film-forming, essentially water-insoluble material which in its molecular structure has a hydrophobic portion and a hydrophilic end group capable of anchoring said hydrophobic portion in a substantially vertical position with respect to the surface of one of said bodies, and which is capable of forming a substantially rigid monomolecular structure, at least the final stratum of said film-forming material having been formed by casting on a liquid surface, and having been applied to one of said electrically conducting bodies by passing the latter through the surface of the casting liquid, said substrate being bonded to one of said electrically conducting bodies.

21. Circuit element in accordance with claim 20 wherein said substrate is bonded to said electrically conducting body through a second film of said material.

22. Circuit element in accordance with claim 21 wherein said second film comprises two strata having molecular arrangements which permit lateral slippage between said substrate and said associated bodies.

References Cited in the file of this patent

UNITED STATES PATENTS

| | | |
|---|---|---|
| 2,907,680 | Smith et al. | Oct. 6, 1959 |
| 2,936,435 | Buck | May 10, 1960 |